July 14, 1936.　　　W. E. PHILLIPS　　　2,047,288
FOOD MIXER SUPPORT
Filed April 11, 1934　　　4 Sheets-Sheet 1
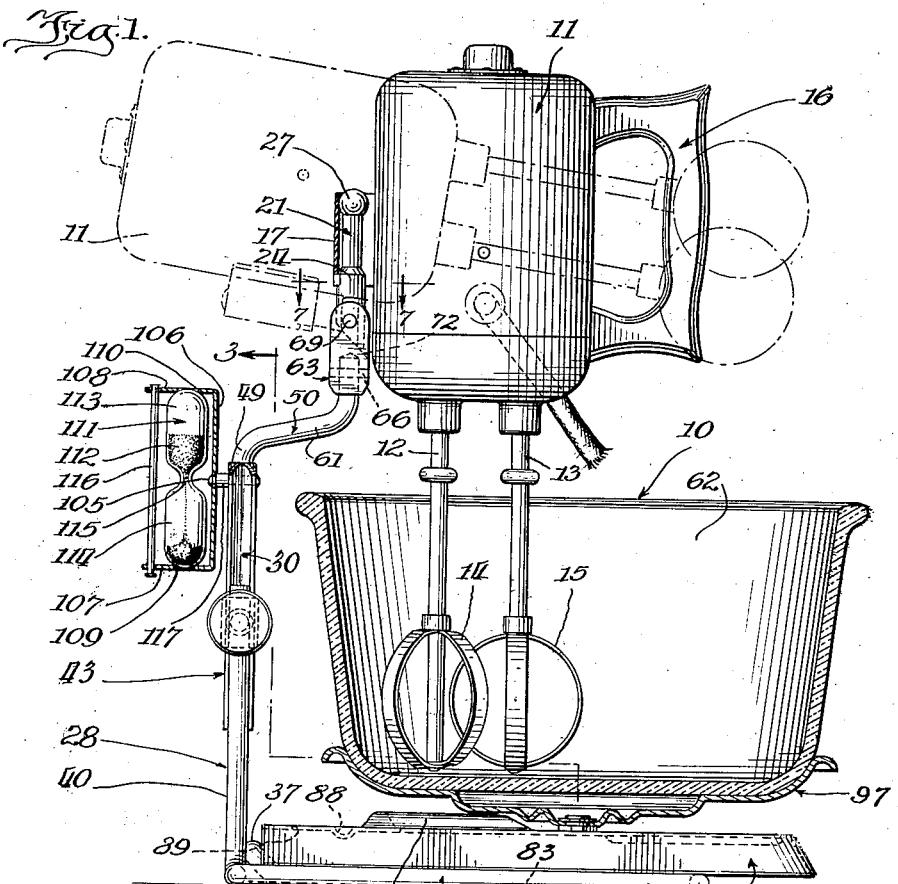
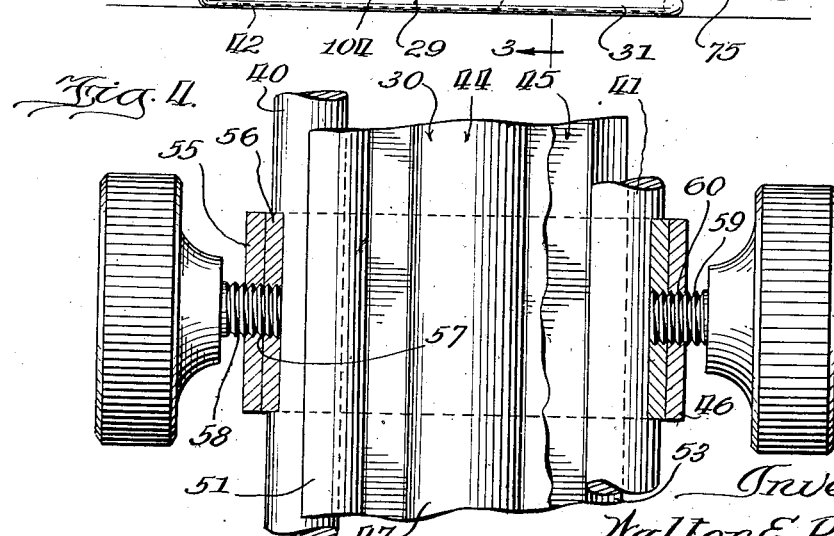

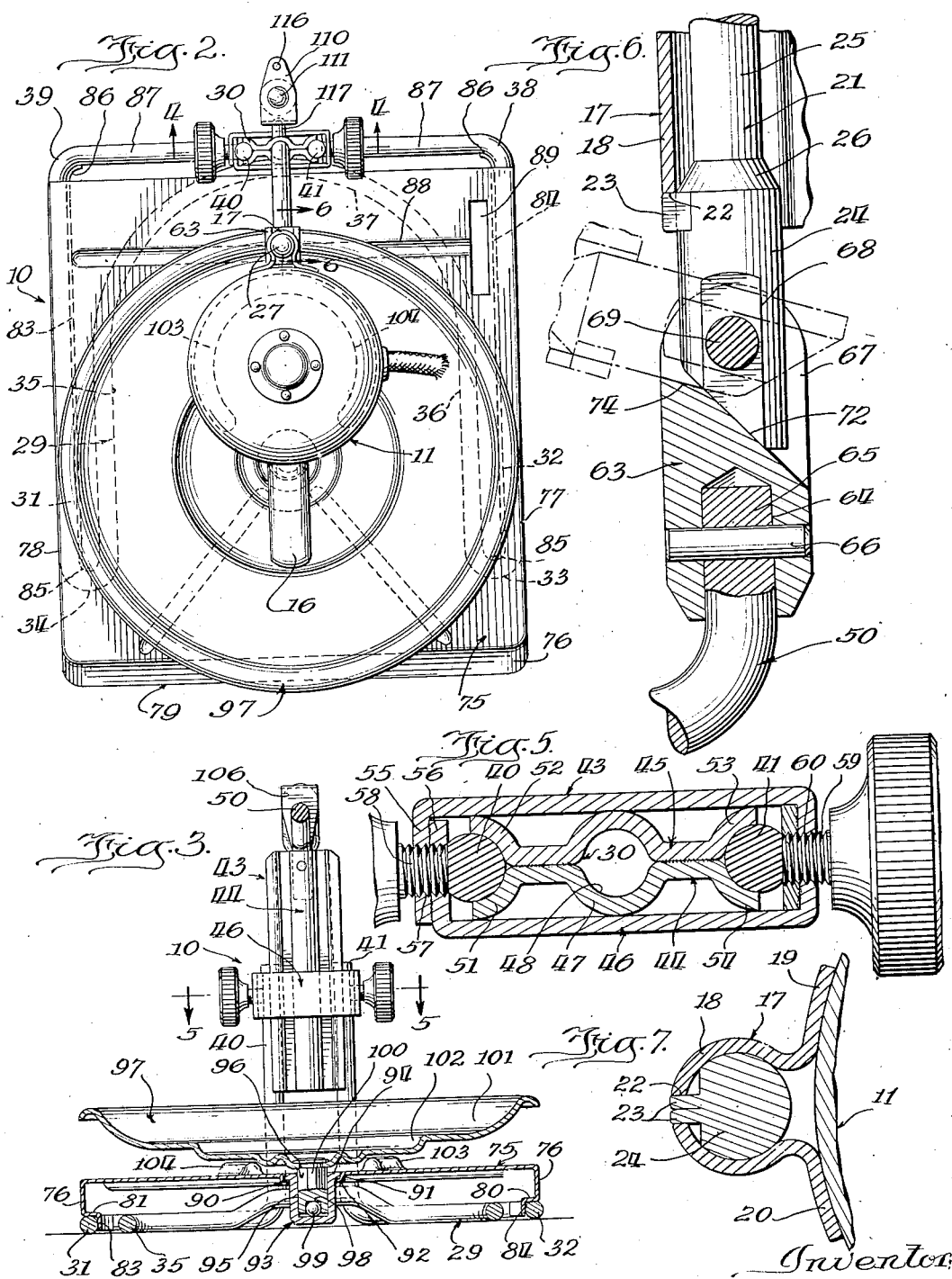

July 14, 1936. W. E. PHILLIPS 2,047,288
FOOD MIXER SUPPORT
Filed April 11, 1934 4 Sheets-Sheet 3
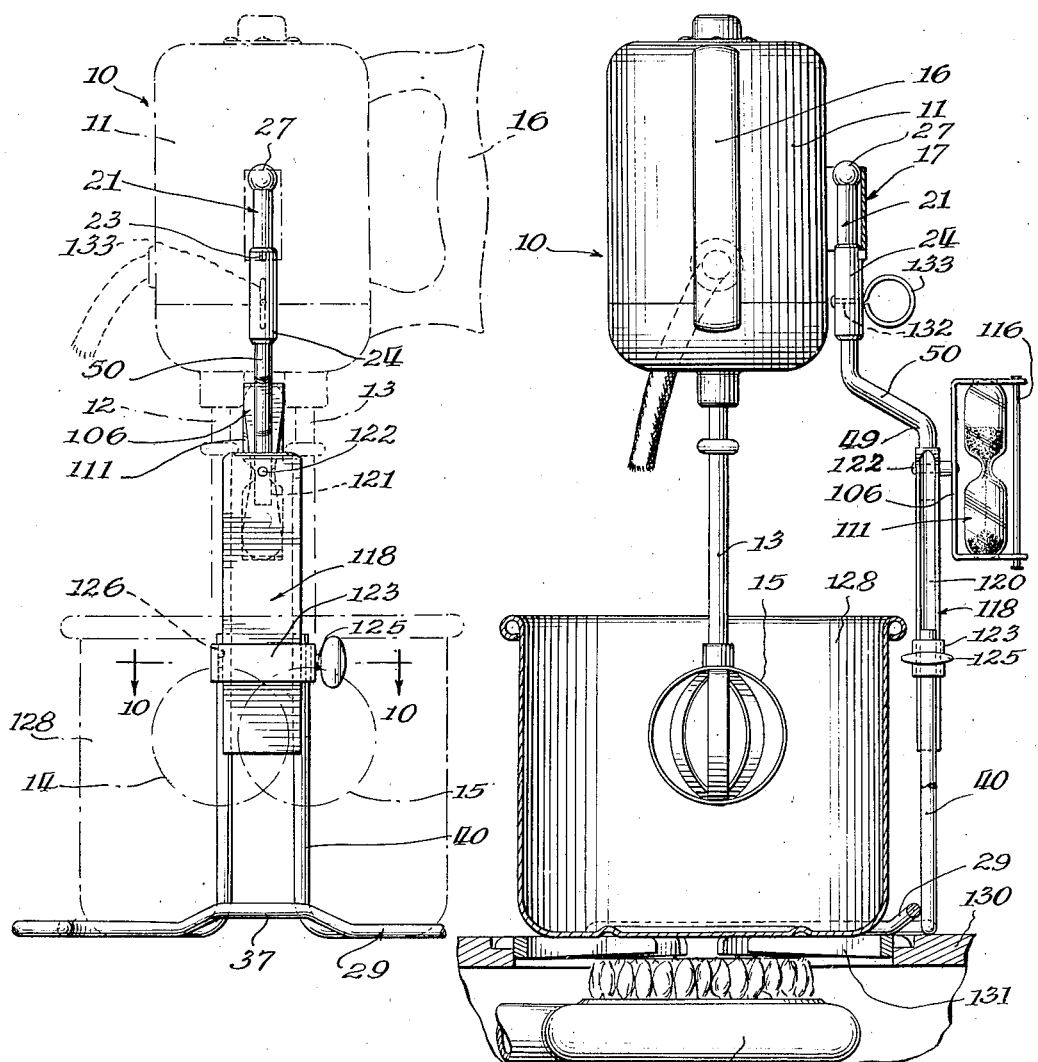
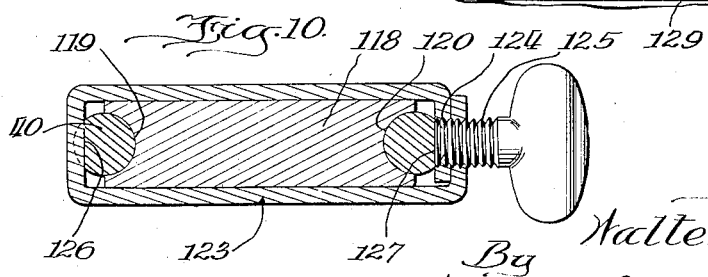
Inventor
Walter E. Phillips July 14, 1936.     W. E. PHILLIPS     2,047,288
FOOD MIXER SUPPORT
Filed April 11, 1934     4 Sheets-Sheet 4
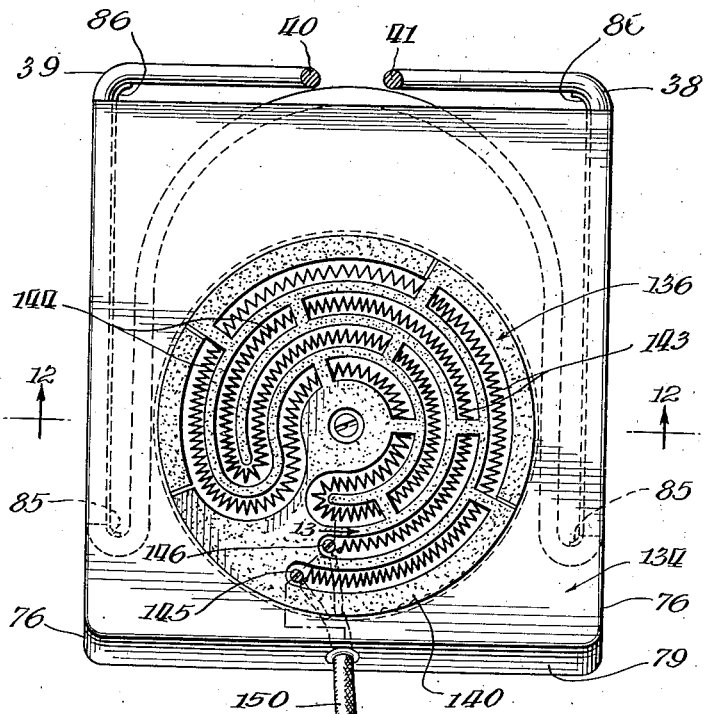
Fig. 11.
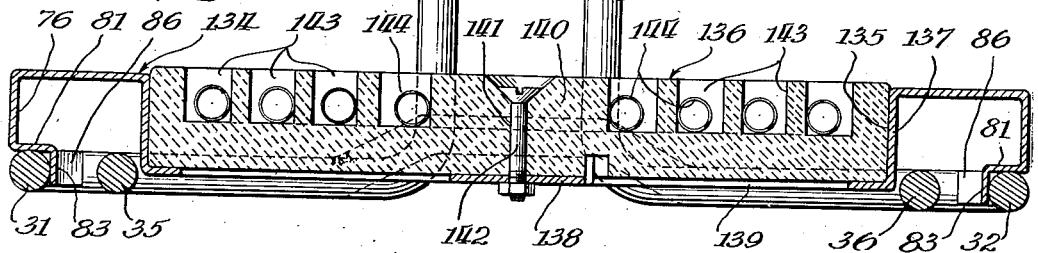
Fig. 12.
Fig. 13.
Inventor:
Walter E. Phillips
By Williams, Bradbury, McCaleb & Hinkle
Attys.

Patented July 14, 1936

2,047,288

UNITED STATES PATENT OFFICE.

2,047,288

FOOD MIXER SUPPORT

Walter E. Phillips, Chicago, Ill., assignor to A. F. Dormeyer Mfg. Co., Chicago, Ill., a corporation of Illinois Application April 11, 1934, Serial No. 719,986

7 Claims. (Cl. 259—84)

The present invention relates to food mixer supports, and is particularly concerned with supports for food mixers of the type intended for household use, for mixing, beating, whipping, and many other operations connected with cooking.

One of the objects of the present invention is the provision of an improved food mixer support which is peculiarly adapted to be utilized for a stove unit, so that the food mixer may be supported in proper position for mixing ingredients contained in a pan or the like which is located over a fire or upon a stove.

Another object of the invention is the provision of an improved food mixer support of the class described which is adjustable in such manner that the food mixer may be utilized with pans of various sizes and with double boilers.

Another object of the invention is the provision of an improved food mixer support of the class described for peculiarly adapting the mixer for use in making the popular seven minute icing, and which also includes a timing device for determining the length of time during which the mixing operation should be carried out.

Another object of the invention is the provision of an improved stove unit mixer support which is also adapted to be utilized with auxiliary bowls and with a turntable so that the beaters rotate the turntable and bowl and effect a mixing of the entire contents of the bowl.

Another object of the invention is the provision of an improved food mixer support of the class described, including a removable turntable and a removable base for a turntable, which are adapted for use with large and small bowls.

Another object of the invention is the provision of an improved food mixer support in which the mixer is adjustably mounted to be supported in a position with the beaters in the bowl or with the beaters disposed above the bowl in such position that the drippings from the beaters will still fall in the bowl.

Another object of the invention is the provision of an improved food mixer assembly, the separate units of which are peculiarly adapted to be sold separately, and the parts of which are capable of conjoint use while the mixer and its stove unit support are also capable of separate use, so that the household user may purchase the basic unit and then add to the unit from time to time by the purchase of additional features extending the usefulness of the device.

Another object of the invention is the provision of an improved food mixer support of the class described which is sturdy, rigid, and capable of such economical manufacture that the device may be produced at a very low cost and placed within the means of a vast number of users who have heretofore not been able to afford mixers having the advantages of the present device.

Other objects and advantages of the invention will be apparent from the following description and from the accompanying drawings, in which similar characters of reference indicate similar parts throughout the several views.

Referring to the drawings, of which there are four sheets:

Fig. 1 is a side elevational view, in partial section, showing a food mixer assembly constructed according to the present invention, with the auxiliary removable base, turntable, and bowl;

Fig. 2 is a top plan view of the device of Fig. 1, with the bowl removed;

Fig. 3 is a fragmentary sectional view, taken on the plane of the line 3—3 of Fig. 1, showing the details of construction of the removable base and turntable, in section, and with the adjustable standard in elevation;

Fig. 4 is an enlarged sectional view, taken on the plane of the line 4—4 of Fig. 2, looking in the direction of the arrows;

Fig. 5 is an enlarged sectional view, taken on the plane of the line 5—5 of Fig. 3, looking in the direction of the arrows;

Fig. 6 is an enlarged fragmentary sectional view, taken on the plane of the line 6—6 of Fig. 2, looking in the direction of the arrows, showing the details of the mode of attachment of the motor to the standard;

Fig. 7 is an enlarged fragmentary sectional view, taken on the plane of the line 7—7 of Fig. 1, showing details of the mode of attachment of the motor to the standard;

Fig. 8 is a rear elevational view of a modification, shown in position for mixing ingredients on a stove;

Fig. 9 is a view similar to Fig. 1 of this modification, showing the mixing unit in positon for mixing ingredients contained in a pan disposed upon a stove;

Fig. 10 is a transverse sectional view, taken on the plane of the line 10—10 of Fig. 8, looking in the direction of the arrows;

Fig. 11 is a bottom plan view of the base plate of another modification in which the metal plate supports what is usually termed a hot plate or an electric heating element for performing the function of a stove;

Fig. 12 is a transverse sectional view, taken on the plane of the line 12—12 of Fig. 11, looking in the direction of the arrows; and Fig. 13 is a fragmentary transverse sectional view taken on the plane of the line 13—13 of Fig. 11, looking in the direction of the arrows.

Referring to Fig. 1, 10 indicates in its entirety the mixer assembly, which preferably comprises an electric motor 11, preferably of the universal type, comprising a series wound commutator motor, the housing of which preferably encloses suitable gears for driving a pair of depending beater shafts 12, 13 at speeds suitable for the various mixing, whipping, chopping, and other operations. The depending beater shafts 12 and 13 preferably support the beating elements 14, 15, which preferably comprise bands of metal bent to circular form, two bands being arranged at right angles to each other and attached to the end of each beater shaft. The beating elements 14, 15 have their respective bands arranged at angles of forty-five degrees to each other, so that they may rotate between each other without interference, and they rotate in opposite directions, being driven by the gears of motor 11. Any suitable type of speed control may be utilized with the motor 11, such as adjustable brushes, series rheostats, or field rheostats.

The beater motor 11 is preferably provided with a heat insulating handle 16 of wood or molded phenolic condensation compound, so that the beater may be lifted from its supporting fixture as a portable beater, when desired.

The motor housing 11 is preferably substantially cylindrical in form and is provided at one side with an attaching stirrup 17, comprising a sheet metal member having a portion 18 of substantially cylindrical form, with a pair of outwardly extending attaching flanges 19 and 20. The flanges 19, 20 curve in the same manner as the housing of the motor 11, and may be attached thereto by rivets, spot welding, or any suitable fastening means.

The cylindrical portion 18 of the stirrup 17 preferably extends over more than half the circumference of the supporting stud 21, so that the stirrup may be firmly mounted on the stud. At each end of the stirrup, and located opposite from the motor 11, there is preferably provided a slot 22, which receives the laterally projecting lugs 23, which are pinched out of the cylindrical part 24 of the supporting stud 21 to prevent the motor 11 and stirrup 17 from rotating on the stud when it is finally settled into its proper position.

The stirrup 17 also rests upon the lugs 23, 23 which limit the downward sliding movement of the stirrup on the stud 21, slots being provided on both ends of the stirrup to adapt the device for support of the motor in upright position or in inverted position, and in the latter case the motor may be used for driving fruit juice extractors and other domestic utensils.

In order to provide for the easy removal of the stirrup 17 from the supporting stud 21, the supporting stud 21 is preferably reduced in size at its central portion 25, as distinguished from the lower cylindrical portion 24, and may be provided with an intermediate frusto-conical part 26, which is useful in guiding the stirrup into its final position.

The frusto-conical part 26 terminates at the top of the lugs 23, so that the lower part of the stirrup actually engages the enlarged cylindrical portion 24, which fits in the circular stirrup 17. At its upper end the supporting stud 21 is preferably provided with a ball shaped formation 27, which is of substantially the same diameter as the cylindrical portion 24, and which serves to hold the stirrup in proper position at that end of the stud. The curved surface on top of the ball 27 is also useful in guiding the stirrup into place when the motor is first placed upon the stud, and the reduced size of the middle portion 25 prevents the binding of the stirrup on the stud when it has been partially removed.

It was found that a supporting stud which is of the same size throughout tends to bind in connection with the stirrup 17, but the stud 21 provided with the two enlargements 27 and 24 support the motor just as firmly, and when the motor has been slightly lifted, there is no binding between the stud and stirrup, and the motor may be quickly removed.

The motor 11 is preferably supported upon a food mixer support, which is indicated in its entirety by the numeral 28, and which consists of a supporting base 29 and a standard 30. The supporting base 29 and standard 30 may be formed in part of metal rods in such manner as to support the motor above a gas flame or stove plate, but not to interfere with the placing of pans or containers which are to be heated from the flame or stove plate.

Thus the base portion 29 may consist of rod portions 31, 32 at each side, which are bent back upon themselves at 33, 34, the rearwardly extending portions 35, 36 being preferably in the same plane as the forwardly extending portions 31, 32.

The rearwardly extending portions 35, 36 are spaced from each other sufficient to permit the reception of a pan between them, as shown in the modification of Fig. 8. They may be joined by a circular curved rod portion 37 at the back. The rod portions 31, 32 are bent inward at right angles at 38, 39, and upward at right angles at the back to provide two upwardly extending rod portions 40, 41, which serve as part of the standard 28.

In order to suitably stiffen the standard with respect to the base, a part of the curved rod portion 37 is bent diagonally upward at 42, and the transverse part 37 may be spot welded, or otherwise fixedly secured to the upwardly extending rods 40, 41, which is found to stiffen the framework in such manner as to provide a very rigid support for the motor.

The upwardly extending rods 40, 41 preferably support a slider 43 which is illustrated in section in Fig. 5 and which adjustably supports the motor on the standard 28. The slider 43 may be formed of a pair of similar sheet metal plates 44, 45 with a sheet metal housing 46. The plates 44, 45 are provided with stamped semi-cylindrical ribs 47, forming grooves 48 on the inside, and when the two plates 44, 45 are placed together a cylindrical bore is provided for receiving the lower end 49 of a motor supporting arm 50.

The plates 44, 45 may be formed by stamping and suitably secured together by spot welding, riveting, or other suitable fastening means. At each edge of each of the plates 44, 45 there is provided a partially cylindrical curved flange 51, 52, 53, 54, for engaging the rods 40, 41, and when the plates 44, 45 are secured together the flanges 51—54 form a pair of semi-cylindrical grooves at the edges of the plate assembly 44, 45 for slidably engaging the rods 40, 41.

The plates 44, 45 of the slider 43 are suitably enclosed in a housing, which may consist of a sheet metal strip 46 bent to substantially box-like or rectangular form, in section in Fig. 5, the two ends 55, 56 being overlapped, and provided with threaded bores 57 for receiving the adjustment screw 58. A similar adjustment screw 59 may be provided in a similar threaded bore 60 in the opposite end of the slider housing 46, and the screws 58, 59, when threaded home, engage the rods 40, 41 and secure the slider in any adjusted position.

In some embodiments of the invention only one clamping screw may be used, but the use of a pair of clamping screws improves the symmetrical appearance of the slider and provides a spare screw in case one of the clamping screws may become lost.

Slider housing 46 and plates 44, 45 may be suitably secured together by welding, riveting, or other fastening means, or may be held in proper position by close fit and frictional engagement with each other when the plates 44, 45 are inserted inside the housing 46.

The motor supporting arm 50 has its lower end 49 preferably fixedly secured in the cylindrical bore which is provided by the grooves 48, and may be secured therein by spot welding or other permanent fastening means in such manner that the forwardly curved portion 61 of the arm 50 extends over toward the bowl and locates the motor in such position that the beaters 14, 14 are disposed at the rear side of the bowl 62. The upper end of the motor supporting arm 50 may be secured to the coupling member 63, which comprises a substantially cylindrical metal member, having a bore 64 for receiving the upper end 65, which is secured therein by a transverse pin 66.

The coupling member 63 is also preferably provided with a slot 67 extending axially of the coupling member 63 into its upper end. Slot 67 is of sufficient width to receive the lower part of the supporting stud 24, which is also provided with a flat part 68 having a bore to receive the transverse pin 69, which is fixedly secured in the coupling member 63, and which extends across the slot 67.

In order to arrange the stud 24 for support in a plurality of positions, the front lower portion 72 of the slot 67 slopes downward and toward the front. Thus the motor might be disposed in upright position with the stud 24 as shown in Fig. 6, and the stud 24 resting on the base of the slot 67, and is held there by gravity due to the weight of the motor and the fact that the motor is disposed forwardly of the stud 24, which brings the major portion of the weight on the forward end portion of stud 24.

Stud 21 may also be tilted backwardly, thereby supporting the motor in a position with its axis at an angle which is parallel to the line 74. The rear portion 74 of the base of the slot 67 extends substantially in a horizontal direction, sloping up only slightly toward the back, and when the motor is moved to the dotted line position of Fig. 1 the center of gravity of the motor is behind its support, and the motor is also held in such position by gravity, with the beaters substantially horizontal, but still disposed above the bowl 62.

The supporting unit thus far described may be utilized without a turntable or the base shown in Fig. 1 for supporting the motor above the pan in the same manner as illustrated in Fig. 8, and this supporting unit may be manufactured at a very low cost so as to bring the supporting unit, motor and beaters in a price range that places it within the means of a vast number of users.

As the means of the user permit, however, it may be desirable to purchase additional units and extend the usefulness of the device, and for this purpose I prefer to provide an auxiliary movable base plate 75, which may be constructed of a sheet metal stamping adapted to be removably secured by engagement with the base 29.

The base plate 75 is preferably substantially rectangular in plan, but may be made any convenient shape, and is preferably provided with a depending border flange 76 upon the two sides 77, 78, and the front 79.

The flanges 76 at the sides 77, 78 preferably extend downward and are bent inward at right angles at 80, 81 so as to rest upon the rod portions 31, 32. The flanges 80, 81 are bent downward at right angles to provide the flange portions 83, 84 which engage inside the rods 31, 32 and determine the position of the base plate 75 upon the base 29. The flanges 83, 84 preferably extend forward as far as the rods 31, 32 and are provided with a slightly curved end portion 85 for engaging the curved portion of the rod at 33, 34 on the inside.

At the opposite ends of the flanges 83, 84 there is also an inwardly curved portion 86 which engages inside the horizontally extending portions 87 of the rods 31, 32. Thus the flanges 83, 84, 85, 86 engage inside the rectangular formations of the rods 31, 32 and definitely locate the plate with respect to the base.

The plate may be secured in place by merely sliding the flanges 83—86 downward inside the rods, where they are resiliently engaged by the adjacent rod portions. The base plate 75 is also provided with transversely extending groove 88 communicating with aperture 89.

The groove 88 is adapted to receive the stem and the aperture 89 the mixing member of a mixing element of the type used for making malted milk and usually included in the equipment of such a food mixer. The base plate 75 is also preferably provided with a centrally located aperture 90 which is bordered by a downwardly extending flange 91 and an inwardly extending flange 92 for supporting a bearing sleeve 93. Bearing sleeve 93 comprises a substantially cylindrical member having a closed lower end and provided at its upper end with an outwardly extending flange 94, which fits inside the flange 91. The sleeve 93 fits in the aperture 90, and its hollow bore 95 is adapted to receive a cylindrical stud 96 carried by a turntable 97.

Stud 96 is preferably provided with a bore 98 in its end for receiving a single ball bearing 99. In order to reduce the friction of the stud 96 the parts of the cylindrical stud 96 may be cut away so as to leave only four partially cylindrical parts 100 which engage in the cylindrical sleeve 93 when the stud rotates. The stud 96 is fixedly riveted in an aperture located in the center of the turntable 97.

The turntable 97 consists of a sheet metal member preferably formed with an outer annular stamped shoulder 101 adapted to fit the larger pans, and with an inner annular shoulder 102 adapted to fit smaller pans. The turntable 97 is thus adapted to support pans or containers of different size rotatably with respect to the base plate 75.

Base plate 75 is also preferably formed with the upwardly extending curved ribs 103, 104 describing an arc suitable for receiving within the ribs 103, 104 a container, such as a tumbler or small receptacle when the turntable 97 is removed from the plate 75.

Referring to Fig. 1, the slider 43 is preferably provided at its rear side with a backwardly extending supporting pin 105, upon which is mounted a supporting frame 106 for a timing device of the type having a fixed aperture for the passage of sand from one chamber to the other. Pin 105 may be utilized for securing the lower end 49 of supporting arm 50 to the slider 43, and it rotatably supports the resilient sheet metal frame 106.

Sheet metal frame 106 consists of a flat plate provided at each end with a backwardly extending flange 107, 108. Flanges 107, 108 are provided with apertures 109, 110 of suitable size to receive the end of the glass 111 which contains a supply of sand 112 and is provided with the two chambers 113, 114 joined by a restricted opening 115. Flanges 107, 108 resiliently engage the ends of the glass 111, and the glass is preferably protected by a pin 116, which is located in apertures in the flanges 107, 108 beyond the glass. Pin 116 is preferably longer than the space between the flanges 107, 108 and is riveted over by both ends so that the flanges may still be separated to remove the glass, but pin 116 protects the glass against breakage in case of dropping or falling over of the standard.

Pin 105 is preferably provided with a spacer 117 for spacing the supporting frame 106 from the slider 43, and the glass may be turned with either end up for the purpose of permitting the sand to flow and timing the operation of making a seven minute icing, which takes a shorter period of time when the icing is subjected to heat while it is being stirred with the food mixer.

Referring to Figs. 8, 9, and 10, these are views of a modification in which the standard may be substantially as previously described, but is provided with a slightly different form of slider.

In this case, the slider is shown in section in Fig. 10, and it is provided with a metallic body 118 having semi-cylindrical grooves 119, 120 at each end. The downwardly extending end 49 of the arm 50 is supported in the body 118 by being inserted in a bore 121 and secured by a pin 122. A sheet metal housing 123 is placed about the slider body 118 and consists of a strip of sheet metal bent to substantially rectangular shape in section, and having its ends overlapped and provided with the threaded bores 124 for receiving the set screw 125. The upwardly extending rods 40 are preferably flattened at 126, 127 to engage the ends of the slider housing 123.

The slider 118 is of sufficient length so that the motor mixer may be lifted up high enough to permit the insertion of a double boiler below the mixer and in between the parts of the base 29. In this case the stirrup 17 is located at one side of the motor, spaced ninety degrees from the handle, and this places the beaters 14 and 15 with their shafts in a plane which is transverse to the major axis of the base. Instead of having the beaters located with their shafts in the plane of a radius of the turntable and mixing bowl 62, the shafts are located on a plane which is transverse to such a radius, and the various elements of the mixture may be subjected to the action of the beaters by moving the container 128 about with respect to the beaters. The same base plate 75 and turntable may be employed with this modification, but, as illustrated, the modification is set up for use on the burner 129 of a gas stove 130, the base 29 resting upon the usual burner grating 131. In this case also the stud 21 is directly secured to the arm 50. The lower cylindrical portion 24 of stud 21 is provided with a bore for receiving the upper end of rod 50, which is secured therein by a pin 132.

Pin 132 has its outer end bent to form a loop 133, which may be used for lifting the stove unit, as the loop 133 does not have sufficient heat conducting relation with the lower part of the stove unit to become hot.

Referring, now, to Figs. 11 to 13, these are views of modifications in which the structure of the motor supporting base and standard may be exactly as described with respect to Figs. 8 and 9 or Figs. 1 to 7. In this case, however, the base plate 134, which is similar in its outer structure to the base plate 75, previously described, is provided with a hot plate or electric grille heater unit, for the purpose of heating the ingredients in a receptacle while they are being mixed, beaten or whipped. Thus all of the details of the outer part of the plate 134 may be exactly as shown in Fig. 3. It is provided with depending side flanges 76 and a front flange 79. The flanges 76 are provided with horizontal portions 81 and depending flanges 83 which engage inside the rods 31, 32.

At the ends of flanges 83 there are curved portions 85, 86 which engage in the curved portions at the ends of the rods 31, 32 for definitely fixing the position of the plate 134 with respect to the base.

In this embodiment, however, plate 134 is provided with a centrally located stamped recess 135 of sufficient size to receive the heating unit 136, shown in section in Fig. 12. The depression 135 is formed by the depending cylindrical wall 137 and is provided with a bottom wall 138 having slots 139 for the purpose of ventilation.

The heating unit 136 consists of a porcelain body 140, which is provided with a centrally located countersunk bore 141 for receiving a screw bolt 142 which passes through the porcelain body 140 and through an aperture in the bottom 138 to secure the heating unit in the recess 135. The porcelain body 140 is of sufficient size in diameter and thickness to fit in the recess 135 and is provided with a multiplicity of arcuate slots 143 for receiving the parts of the heating element 144, which consists of suitable resistance wire, preferably in coiled helical form.

At the points 145, 146 there are provided apertures for receiving the connector bolts 147, 148, which form the terminals of the heating element which are connected by conductors 149 to the outgoing supply cord 150. By tracing the course of the electrical heating element 144 it will be observed that it passes from the point 145 about the interconnecting grooves 143 of the porcelain body 140, and finally terminates at the point 146.

I desire it to be understood that any modern type of hot plate or heating element may be employed in place of that illustrated, such as elements having two or three heat units and having appropriate switches and connections for diminishing or increasing the heat of the element by the amount of the electricity.

It will thus be observed that I have invented an improved food mixer support and food mixer embodying a number of new features, all of which are separable and which may be purchased one by one to extend the range of usefulness of the food mixer. The food mixer support is adapted to be placed upon a range or gas stove and used with a double boiler or any type of cooking receptacle for supporting the motor above the receptacle so that the contents can be mixed or beaten while being subjected to heat.

The range of adjustability of the motor upward and downward permits the use of ordinary receptacles or double boilers, and the motor may be tilted backward so as to reach any part of the mixture in the receptacle, or it may be entirely removed from the mixture and supported by the fixture in position so that drippings will fall in the receptacle.

The present unit may also be supplied with its individual hot plate carried by the removable supporting plate, and it may be supplied with a removable plate and with a turntable. Due to the fact that the supporting fixture is constructed of metallic rods it may be manufactured at a very low cost so that it may be placed within the range of a large number of users, but due to its structure and arrangement this fixture is just as rigid and effective as any of the more expensive cast metal devices for supporting motors which cannot be used over a heating device.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a food mixer, the combination of a motor provided with depending shafts having beaters, with a supporting fixture, comprising a pair of upwardly extending rods carried by horizontally extending rods forming a base, a slider being interposed between said motor and said upwardly extending rods for adjustment of said mixer, said slider comprising a metal member formed with semi-cylindrical grooves at each end and adapted to be received between said rods, and threaded means carried by said slider for engaging one of said rods to secure said slider in place.

2. In a food mixer, the combination of a motor provided with depending shafts having beaters, with a supporting fixture, comprising a pair of upwardly extending rods carried by horizontally extending rods forming a base, a slider being interposed between said motor and said upwardly extending rods for adjustment of said mixer, said slider comprising a metal member formed with semi-cylindrical grooves at each end and adapted to be received between said rods, and threaded means whereby said slider engages one of said rods to secure it in place, said slider having a metal housing extending about said rods and having a threaded bore for receiving said threaded means.

3. In a base for a food mixer support, a fixture form made of a rod, said rod having two upwardly extending parallel portions and having its lower portions extending laterally, then forwardly and then backwardly, to form two spaced base portions, said backwardly extending portions being joined together whereby the fixture may be constructed of a single rod, said backwardly extending portions being also curved upward and secured to said parallel portions to stiffen the fixture.

4. In a base for a food mixer support, a fixture form made of a rod, said rod having two upwardly extending parallel portions and having its lower portions extending laterally, then forwardly and then backwardly, to form two spaced back portions, said backwardly extending portions being joined together whereby the fixture may be constructed of a single rod, and a removable plate for support by said forwardly extending portions, said removable plate having depending flanges engaging inside said forwardly extending portions, and having end flanges for determining the final position of said plate with respect to said fixture.

5. In a base for a food mixer support, a fixture form made of a rod, said rod having two upwardly extending parallel portions and having its lower portions extending laterally, then forwardly and then backwardly, to form two spaced back portions, said backwardly extending portions being joined together whereby the fixture may be constructed of a single rod, and a removable plate for support by said forwardly extending portions, said removable plate having depending flanges engaging inside said forwardly extending portions, and having end flanges for determining the final position of said plate with respect to said fixture, and a turntable rotatably mounted upon said removable plate.

6. In a food mixer support, the combination of a base comprising a rod having a pair of upwardly extending end portions located parallel to each other and also having a horizontally extending supporting portion, a slider having grooves complementary to the upwardly extending end portions of said rod, threaded clamping means carried by said slider for securing said slider in predetermined position on said rod, an arm carried by said slider, a stud pivotally mounted on said arm, a food mixer comprising a motor housing, and a stirrup carried by said motor housing and slidably mounted on said stud.

7. In a food mixer support, the combination of a base comprising a rod having a pair of upwardly extending end portions located parallel to each other and also having a horizontally extending supporting portion, a slider having grooves complementary to the upwardly extending end portions of said rod, threaded clamping means carried by said slider for securing said slider in predetermined position on said rod, an arm carried by said slider, a stud pivotally mounted on said arm, a food mixer comprising a motor housing, and a stirrup carried by said motor housing and slidably mounted on said stud, said stirrup having a slot, and said stud having a complementary lug engaging in said slot to prevent rotation of said housing with respect to said stud.

WALTER E. PHILLIPS.